(12) United States Patent
Mishima (10) Patent No.: US 8,384,325 B2
(45) Date of Patent: Feb. 26, 2013

(54) MOTOR DRIVING CIRCUIT AND METHOD FOR DRIVING MOTOR

(75) Inventor: Tomofumi Mishima, Kyoto (JP)

(73) Assignee: Rohm Co., Ltd. (JP)

( * ) Notice: Subject to any disclaimer, the term of this patent is extended or adjusted under 35 U.S.C. 154(b) by 361 days.

(21) Appl. No.: 12/706,988

(22) Filed: Feb. 17, 2010

(65) Prior Publication Data

US 2010/0225263 A1 Sep. 9, 2010

(30) Foreign Application Priority Data

Feb. 17, 2009 (JP) ................................. 2009-034574
Feb. 3, 2010 (JP) ................................. 2010-021837

(51) Int. Cl.
*H22P 0/04* (2006.01)
(52) U.S. Cl. ................... 318/400.09; 318/447; 318/472; 318/434; 318/798; 318/430; 363/50; 361/30; 361/23; 361/31; 361/28; 323/274; 323/284
(58) Field of Classification Search ................. 318/447, 318/472, 400.21, 400.22, 434, 798, 432, 318/430; 363/50; 361/30, 23, 31, 28, 1; 323/284, 274
See application file for complete search history.

(56) References Cited

U.S. PATENT DOCUMENTS

| | | | | |
|---|---|---|---|---|
| 5,901,268 A | * | 5/1999 | Ando et al. | 388/811 |
| 7,773,352 B2 | * | 8/2010 | Mishima | 361/30 |
| 2007/0098373 A1 | * | 5/2007 | Saito et al. | 388/811 |
| 2008/0048598 A1 | * | 2/2008 | Shibuya | 318/400.1 |
| 2008/0107408 A1 | * | 5/2008 | Sugie | 388/815 |
| 2008/0247734 A1 | * | 10/2008 | Sugie | 388/811 |
| 2009/0045762 A1 | * | 2/2009 | Hayashi et al. | 318/379 |

FOREIGN PATENT DOCUMENTS

| | | |
|---|---|---|
| JP | 10-234130 A | 9/1998 |
| JP | 2005-6405 A | 1/2005 |
| JP | 2006-180608 A | 7/2006 |
| JP | 2008-263733 A | 10/2008 |

* cited by examiner

*Primary Examiner* — Walter Benson
*Assistant Examiner* — Jorge L Carrasquillo
(74) *Attorney, Agent, or Firm* — Cantor Colburn LLP (57) ABSTRACT

A motor driving circuit receives a control pulse signal pulse-width modulated according to a target rotational speed, and drives a fan motor. A start pulse signal generating unit generates a start pulse signal having a predetermined duty ratio. A driving unit drives the fan motor by pulse width modulation according to the driving pulse signal received from a control unit. When the duty ratio of the control pulse signal is switched from zero to a nonzero value when the fan motor is in the stopped state, the control unit commences the driving operation for the fan motor. The control unit outputs, as the driving pulse signal, the start pulse signal, in a predetermined start period Ts from the commencement of the driving operation. After the start period elapses, the control unit outputs the control pulse signal as the driving pulse signal.

19 Claims, 7 Drawing Sheets

MOTOR DRIVING CIRCUIT AND METHOD FOR DRIVING MOTOR

BACKGROUND OF THE INVENTION

1. Field of the Invention

The present invention relates to a motor driving technique using pulse width modulation (PWM), and particularly to a control technique for starting up the motor.

2. Description of the Related Art

In recent years, increase in the operation speed of personal computers and workstations has led to rapid increase in the operation speeds of computation LSIs (Large Scale Integrated Circuit) such as CPUs (Central Processing Unit), DSPs (Digital Signal Processor), etc. Such LSIs have a problem in that an increase in the operation speed, i.e., an increase in clock frequency involves an increase in heat generation. The heat generation of the LSI leads to thermal runaway of the LSI itself, or affects its peripheral circuits, which becomes a problem. Accordingly, such a situation requires a suitable thermal cooling operation for the LSI, as a crucial technique.

Examples of techniques for cooling an LSI includes an air-cooling cooling method employing a cooling fan. In this method, for example, a cooling fan is arranged such that it faces the surface of the LSI, and cool air is blown onto the surface of the LSI using the cooling fan.

In some arrangements in which a motor (which is also referred to as a "fan motor") which is a component of a cooling fan is driven, the time in which current is applied to the motor (the duty ratio) is controlled by pulse width modulation, thereby controlling the torque of the motor, i.e., the rotational speed.

RELATED ART DOCUMENTS

Patent Documents

[Patent Document 1]
Japanese Patent Application Laid Open No. 2005-6405
[Patent Document 2]
Japanese Patent Application Laid Open No. H10-234130
[Patent Document 3]
Japanese Patent Application Laid Open No. 2008-263733
[Patent Document 4]
Japanese Patent Application Laid Open No. 2006-180608

The inventor has investigated such PWM motor driving circuits, and has come to recognize the following problems.

Figure 1:
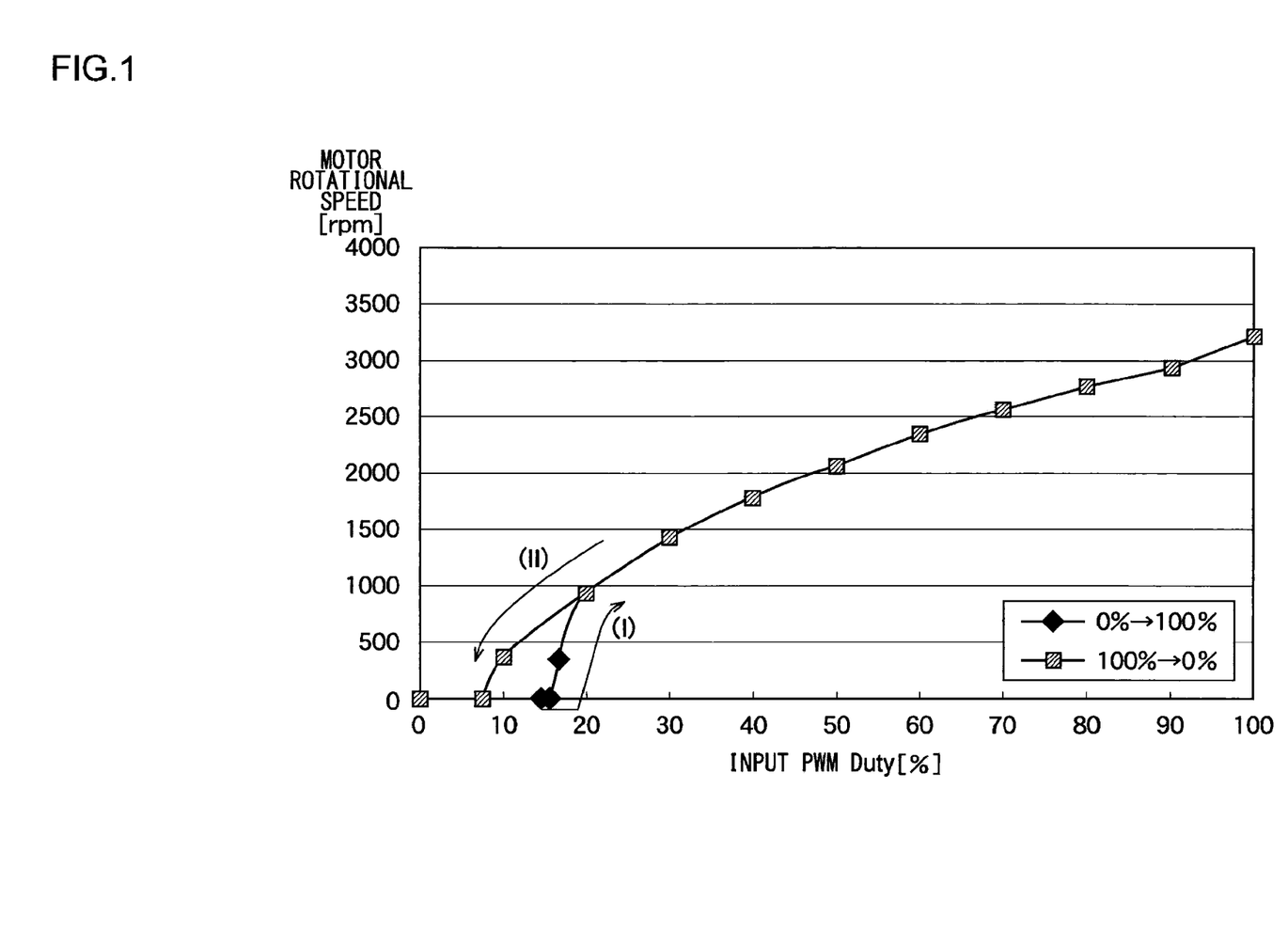
FIG. 1 is a graph which shows the relation between the rotational speed of a fan motor and the duty ratio.

FIG. 1 is a graph which shows the relation between the rotational speed of a fan motor and the duty ratio. When the duty ratio is to be increased from 0% to 100% when the motor has stopped, a duty ratio in a range which is lower than a predetermined threshold value (e.g., 15%) is insufficient for the motor to start to rotate, leading to a situation in which the rotational speed of the motor remains zero. On the other hand, in a duty ratio range which is higher than the threshold value, the rotational speed increases according to the increase in the duty ratio (acceleration characteristics (I)). Conversely, when the duty ratio is reduced toward 0% when the motor is in the rotating state, the motor stops to rotate at a duty ratio which is lower than 9% (braking characteristics (II)), in an example shown in FIG. 1.

In a case in which it is desired to quietly start up a motor which is in the stopped state, the motor should be driven with a low duty ratio so as to rotate at a low rotational speed. However, as shown in FIG. 1, in some cases, such a low duty ratio results in insufficient torque for the motor to start to rotate. Conversely, in a case in which it is desired to start up the motor in a sure manner, the motor should be driven with a high duty ratio. However, an excessively high duty ratio leads to a large amount of noise from the fan motor. In particular, low noise is desirable in laptop PCs and so forth, and accordingly, the value of such products is affected by the fan motor noise.

In view of such a situation, in conventional techniques, the designer of a set mounting a fan motor must adjust the duty ratio for the startup operation by trial and error. Such a problem is not restricted to a fan motor. Rather, this problem is a general problem that can occur in various types of motors.

SUMMARY OF THE INVENTION

The present invention has been made in view of such a situation. Accordingly, it is an exemplary purpose of the present invention to provide a driving technique for allowing a motor to be started up in a sure manner by means of a simple control operation.

An embodiment of the present invention relates to a driving circuit configured to receive a control pulse signal pulse-width modulated according to a target rotational speed, and to drive a motor according to the control pulse signal. The driving circuit comprises: a start pulse signal generating unit configured to generate a start pulse signal having a predetermined duty ratio; a control unit configured to output, as a driving pulse signal, one signal selected from among the start pulse signal and the control pulse signal; and a driving unit configured to drive the motor by pulse width modulation according to the driving pulse signal. In the state in which the motor has stopped, the control unit starts to drive the motor when the duty ratio of the control pulse signal is switched from zero to a nonzero value. In a start period from the commencement of the driving operation for the motor, the control unit outputs the start pulse signal as the driving pulse signal. After the start period elapses, the control unit outputs the control pulse signal as the driving pulse signal.

Such an embodiment is capable of starting up the motor in a sure manner according to the duty ratio of the start pulse signal generated by an internal component of the driving circuit even if the duty ratio of the control pulse signal is a small value that is insufficient to provide a torque which is required to start up the motor.

Also, in the start period, when the duty ratio of the control pulse signal is smaller than a predetermined threshold value, the control unit may output the start pulse signal as the driving pulse signal. Also, when the duty ratio of the control pulse signal is greater than the threshold value, the control unit may output the control pulse signal as the driving pulse signal.

Such an embodiment is capable of starting up the motor in a short period of time at the expense of quietness. For example, such an embodiment operates effectively in a case in which there is a need to rapidly cool the target by means of the fan motor.

Also, the start pulse signal generating unit may be configured as an oscillator which oscillates with a predetermined frequency.

Also, the start pulse signal generating unit may generate a start pulse signal which is set to a first level for a predetermined ON time after one edge selected from among a positive edge and a negative edge of the control pulse signal is detected, and which is set to a second level which is complementary to the first level until the next selected edge is detected after the first level state.

With such an arrangement, the start pulse signal can be generated synchronously with the control pulse signal. Furthermore, such an arrangement provides a simple signal processing for generating the driving pulse signal.

Also, the start period may be a time period from the commencement of the driving operation for the motor until a predetermined time elapses.

Also, the start period may be a time period from the commencement of the driving operation of the motor until the rotational speed of the motor reaches a predetermined value.

The start period may be a time period from the commencement of the driving operation for the motor until the rotor of the motor has rotated by a predetermined angle.

Also, the driving circuit according to an embodiment may further comprise: a lock protection circuit configured to stop the application of current to the motor in a case in which the motor is stopped; and a lock control unit configured to set the lock protection circuit to the inactive state in a case in which the control pulse signal instructs the motor to stop its operation for a first time period or more.

With such an embodiment, in a case in which the control pulse signal has instructed the motor to stop its operation for the first time period or more, the lock control unit switches the lock protection circuit to the inactive state. Thus, such an arrangement is capable of restarting the operation immediately after the motor has stopped according to an instruction of the control pulse signal.

Also, the driving circuit may be monolithically integrated on a single semiconductor substrate. Examples of "arrangements monolithically integrated" include: an arrangement in which all the elements of a circuit are formed on a single semiconductor substrate; and an arrangement in which principal elements of a circuit are monolithically integrated. Also, a part of the resistors, capacitors, and so forth, for adjusting circuit constants, may be provided as elements external of the semiconductor substrate. By monolithically integrating the motor driving circuit in the form of a single LSI, such an arrangement provides a reduced circuit area.

Another embodiment of the present invention relates to a cooling apparatus. The cooling apparatus comprises: a fan motor; and a driving circuit according to any one of the above-described embodiments, configured to drive the fan motor.

Such an arrangement allows the fan motor to be started up in a sure manner, thereby suitably cooling the object.

Yet another embodiment of the present invention relates to a driving method for driving a motor according to a pulse-width modulated control pulse signal. The driving method comprises: a first step in which a driving operation is started for the motor when the duty ratio of the control pulse signal is switched from zero to a nonzero value; a second step in which the motor is driven with a predetermined duty ratio which is independent of the duty ratio of the control pulse signal in a start period from the commencement of the driving operation for the motor; and a third step in which the motor is driven with the duty ratio of the control pulse signal after the start period elapses.

Also, in the second step, in the start period, when the duty ratio of the control pulse signal is smaller than a predetermined threshold value, the motor may be driven with the predetermined duty ratio. Also, when the duty ratio of the control pulse signal is greater than the threshold value, the motor may be driven with the duty ratio of the control pulse signal.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 2:
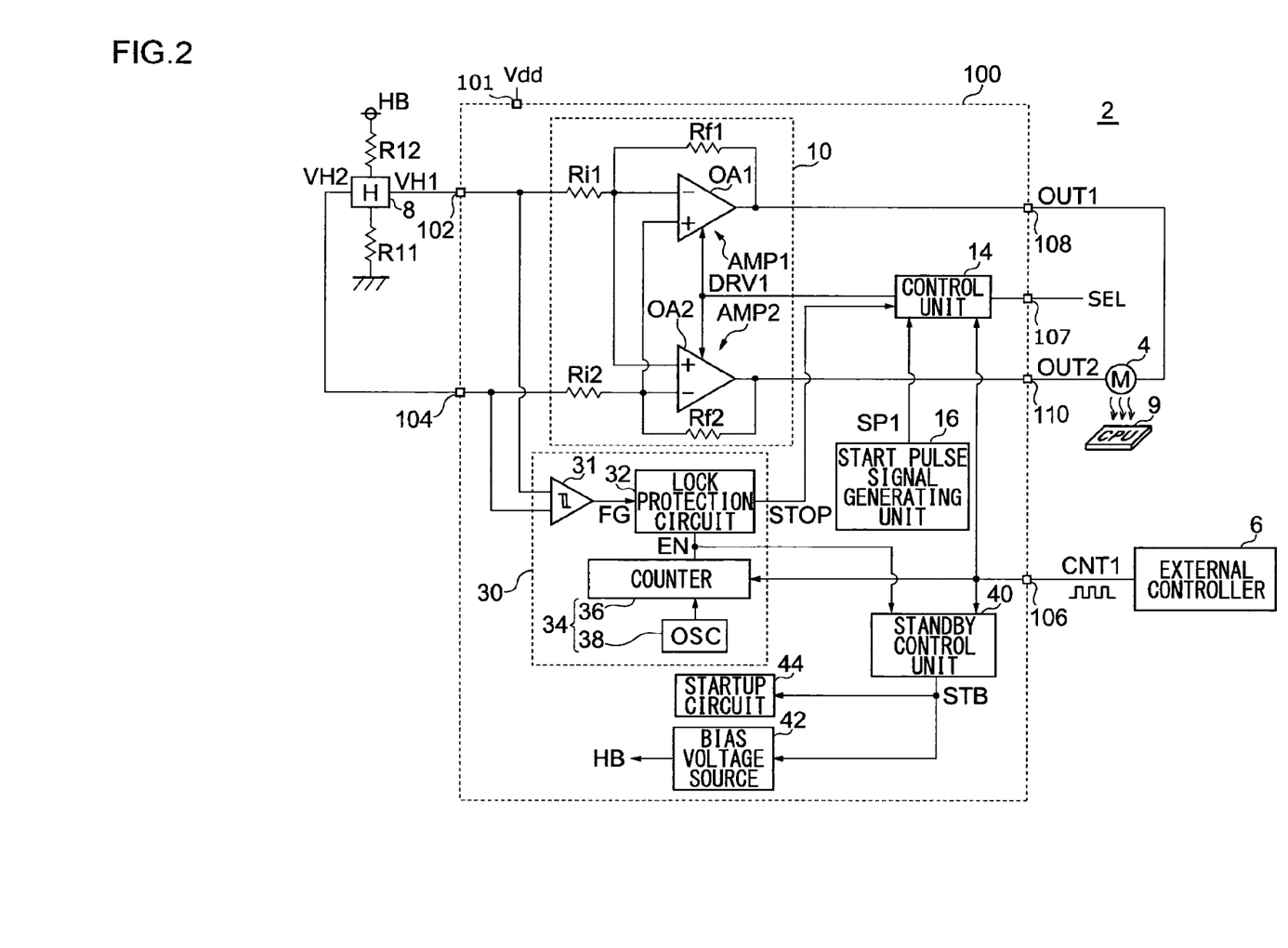
FIG. 2 is a circuit diagram which shows a configuration of a cooling system including a motor driving circuit according to an embodiment.

An embodiment relates to a driving circuit for a fan motor configured to cool a cooling target (which will simply be referred to as the "target") such as a CPU or the like. FIG. 2 is a circuit diagram which shows a configuration of a cooling system 2 including a motor driving circuit 100 according to the embodiment.

The cooling system 2 includes a fan motor 4, an external controller 6, a Hall element 8, a motor driving circuit 100, and a target 9, as principal components. The fan motor 4 is a single-phase full-wave motor, and is arranged such that it faces the target 9. In an arrangement, the target 9 is a heat pipe (heat sink) connected to a CPU to be cooled. Also, in another arrangement, the target 9 is a CPU itself. With the fan motor 4, the coil current, i.e., the current application state is controlled according to a driving voltage output from the motor driving circuit 100, thereby controlling the rotation of the fan motor 4.

The external controller 6 controls the overall operation of the cooling system 2. The external controller 6 outputs, to a control input terminal 106 of the motor driving circuit 100, a control pulse signal CNT1 pulse-width modulated according to the target rotational speed to be set for the fan motor 4. The duty ratio of the control pulse signal CNT1 will also be referred to as the "external duty ratio DREXT".

A first terminal of the Hall element 8 is connected to a power supply line from which a Hall bias voltage HB is applied via a resistor R12, and a second terminal thereof is grounded via a resistor R11. A combination of the resistor R12 and the resistor R11 adjusts the amplitude of a signal output from the Hall element 8. Accordingly, either the resistor R11 or the resistor R12 or both of these resistors R11 and R12 may be shunted, depending on the common-mode input range of the later-mentioned hysteresis comparator 31. It should be noted that the Hall bias voltage HB is generated by a bias voltage source 42 of the motor driving circuit 100.

The Hall element 8 outputs a first Hall signal VH1 and a second Hall signal VH2 the levels of which each change according to the position of a rotor of the fan motor 4. When the fan motor 4 is rotating, the first Hall signal VH1 and the second Hall signal VH2 are signals having reverse phases, and are each sine waves having a cycle (frequency) that changes according to the rotational speed of the fan motor 4.

The motor driving circuit 100 receives the first Hall signal VH1 and the second Hall signal VH2 via a first input terminal 102 and a second input terminal 104, respectively. The motor driving circuit 100 detects the position of the rotor of the fan motor 4 based upon the Hall signals VH1 and VH2. Furthermore, the motor driving circuit 100 drives the fan motor 4 by PWM according to the control pulse signal CNT1 while inverting the polarity of the voltage to be applied to the fan motor 4 according to the position of the rotor. That is to say, a pulse-modulated switching signal having a sine-wave-shaped envelope is applied to both terminals of the fan motor 4. It should be noted that the PWM driving method is not restricted in particular.

That is to say, with the cooling system 2, the rotational speed of the fan motor 4 is controlled according to the duty ratio DREXT of the control pulse signal CNT1 generated by the external controller 6, thereby adjusting the temperature of the target 9.

The above is the overall configuration of the cooling system 2. Description will be made below regarding the configuration of the motor driving circuit 100.

The motor driving circuit 100 includes a driving unit 10, a control unit 14, a start pulse signal generating unit 16, a protection circuit 30, a standby control unit 40, a bias voltage source 42, and a startup circuit 44, which are integrated on a single semiconductor substrate.

The driving unit 10 receives a driving pulse signal DRV1 output from the control unit 14, and drives the fan motor 4 by pulse width modulation using the driving pulse signal DRV1 thus received.

For example, the driving unit 10 includes a first amplifier AMP1 and a second amplifier AMP2. The first amplifier AMP1 and the second amplifier AMP2 are inverting amplifiers which invert and amplify the first Hall voltage VH1 and the second Hall voltage VH2, respectively.

Specifically, the first amplifier AMP1 includes a first operational amplifier OA1, a first input resistor Ri1, and a first feedback resistor Rf1. The first input resistor Ri1 is arranged between the first input terminal 102 and the inverting input terminal of the first operational amplifier OA1. The first feedback resistor Rf1 is arranged between the output terminal and the inverting input terminal of the first operational amplifier OA1. The non-inverting input terminal of the first operational amplifier OA1 is connected to the inverting input terminal of a second operational amplifier OA2 on the second amplifier AMP2 side. The second amplifier AMP2 has the same configuration as that of the first amplifier AMP1. A reference bias voltage may be input to the non-inverting input terminals of the first operational amplifier OA1 and the second operational amplifier OA2.

The output voltage OUT1 of the first amplifier AMP1 is supplied to one terminal of the fan motor 4 via a first output terminal 108. The output voltage OUT2 of the second amplifier AMP2 is supplied to the other terminal of the fan motor 4 via a second output terminal 110.

The first amplifier AMP1 and the second amplifier AMP2 each receive the driving pulse signal DRV1 as an input signal, and output the output voltages OUT1 and OUT2, respectively. The output voltages OUT1 and OUT2 are repeatedly switched between a state in which the output voltages OUT1 and OUT2 are respectively set to values that correspond to the Hall voltages VH1 and VH2, and a state in which both of these output voltages OUT1 and OUT2 are set to the low level (which will be referred to as the "both output L state"), synchronously with the driving pulse signal DRV1 (PWM driving operation). For example, in a case in which the output stage of each of the first operational amplifier OA1 and the second operational amplifier OA2 has a push-pull circuit configuration including high-side transistors and low-side transistors, the fan motor 4 is connected to an H-bridge circuit. In the both output L state, two low-side transistors included in the H-bridge circuit are switched on. Such an arrangement using the both output L state provides regenerative current via a loop path including either the ON resistance or the body diode of one low-side transistor, the motor, and the channel of the other transistor, which is advantageous from the perspective of power consumption.

The high-impedance state may be used instead of the both-terminal L state. In this case, in a period in which the state is to be set to the high-impedance state, all the transistors that form the H-bridge circuit should be switched off.

The start pulse signal generating unit 16 generates a start pulse signal SP1 having a predetermined duty ratio (which will be referred to as the "internal duty ratio") DRINT. The internal duty ratio DRINT is set to a value which is equal to or greater than the minimum value that is sufficient to start to rotate the fan motor 4 when it has stopped. More preferably, the value of the duty ratio DRINT is set to a value which is equal to or greater than the junction point of the hysteresis loop shown in FIG. 1. Specifically, in a case in which the fan motor 4 has the input/output properties shown in FIG. 1, the duty ratio DRINT of the start pulse signal SP1 is set to a value of 20%, or more, e.g., set to 50%. In a case in which the duty ratio DRINT is set to 50%, the start pulse signal generating unit can be configured using an oscillator which oscillates with a predetermined frequency. The frequency of the start pulse signal SP1 is preferably set to a value which is equal to or greater than the frequency of the control pulse signal CNT1. In a case in which the frequency of the control pulse signal CNT1 is 20 kHz to 30 kHz, the frequency of the start pulse signal SP1 is set to some tens of kHz.

The control unit 14 selects either the start pulse signal SP1 or the control pulse signal CNT1, and outputs the signal thus selected as the driving pulse signal DRV1.

With the fan motor 4 in the stopped state, when the duty ratio DREXT of the control pulse signal CNT1 received from the external controller 6 is switched from zero to a nonzero value, i.e., when the control pulse signal CNT1 is switched from the low-level state to the high-level state, i.e., when a positive edge of the control pulse signal CNT1 is detected, the control unit 14 starts to drive the fan motor 4. In a predetermined period (which will be referred to as the "start period") Ts from the commencement of the driving operation for the fan motor 4, the control unit 14 outputs the start pulse signal SP1 as the driving pulse signal DRV1. This function will be referred to as the "start assist function" hereafter. After the start period Ts elapses, the control unit 14 outputs the control pulse signal CNT1 as the driving pulse signal DRV1.

The start period Ts may be a period from when the fan motor 4 starts to be driven until a predetermined time TC1 elapses. For example, the predetermined time TC1 is on the order of 50 to 300 ms. Alternatively, the start period Ts may be a period from when the fan motor 4 starts to be driven until the rotational speed of the fan motor 4 reaches a predetermined value.

Also, the start period Ts may be a period from when the fan motor 4 starts to be driven until the rotor has rotated by a predetermined angle. The angle by which the rotor has rotated can be detected by monitoring the Hall signals VH1 and VH2, or an FG signal. For example, FG signal edges are detected, and when the number of FG signal edges thus detected reaches a predetermined number, the start period Ts may be ended.

Such an arrangement is preferably configured such that the start assist function using the start pulse signal SP1 can be switched between the enabled state and the disabled state according to a control signal received from an external circuit. Description will be made regarding the reason why.

The motor driving circuit 100 is designed to drive the fan motor 4 by PWM according to the control pulse signal CNT1. However, in some cases, a so-called power supply PWM method is employed, depending upon the platform in which the motor driving circuit 100 is employed. The power supply PWM method is a method in which a switching operation is performed on the power supply voltage Vdd supplied to a power supply terminal 101 of the motor driving circuit 100, and the rotational speed of the fan motor 4 is controlled by controlling the duty ratio of this switching operation. In a case in which the power supply PWM method is employed, the control pulse signal CNT1 is set to a constant level.

If the start assist function is enabled when the power supply PWM is performed, the following problem occurs. That is to say, the switching operation is performed on the power supply voltage Vdd for the motor driving circuit 100, and accordingly, the start pulse signal generating unit 16 is reset every cycle. Accordingly, the start pulse SP1 is repeatedly generated every time the power supply voltage Vdd is switched, and the start pulse SP1 thus generated is supplied to the fan motor 4. As a result, the rotational speed of the fan motor 4 is dominantly controlled according to the duty ratio of the start pulse SP1, which is not the duty ratio of the power supply PWM. This leads to a problem in that a desired rotational speed cannot be obtained.

In order to solve such a problem with respect to the start assist function of the motor driving circuit 100, the motor driving circuit 100 includes a select terminal SEL which receives, as an input signal, a select signal SEL which defines whether the start assist function is to be enabled or disabled.

In a case in which the select signal SEL is an instruction to enable the start assist function, the control unit 14 outputs the start pulse signal SP1 in the start period Ts, following which the control unit 14 outputs the control pulse signal CNT1, as described above.

On the other hand, in a case in which the select signal SEL is an instruction to disable the start assist function, the control unit 14 does not select the start pulse signal SP1 even in the start period Ts, and outputs the driving pulse signal DRV having a constant level which is sufficient for switching on the first operational amplifier OA1 and the second operational amplifier OA2.

Figure 7:
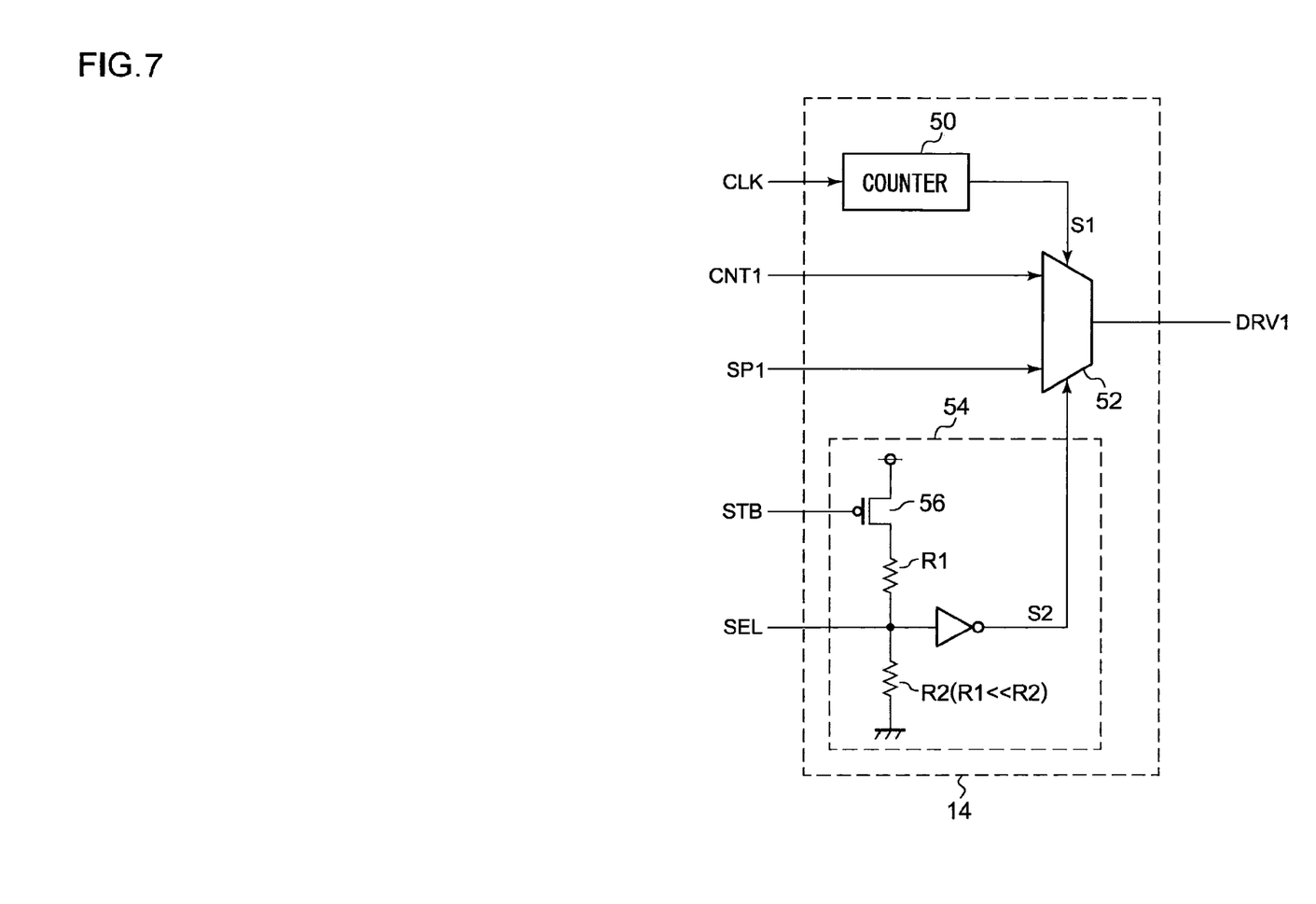
FIG. 7 is an example configuration of a control unit which is capable of switching the enabled state and the disabled state of the start assist function.

FIG. 7 is a circuit diagram which shows an example configuration of the control unit 14 which is capable of switching the state of the start assist function between the enabled state and the disable state. The control unit 14 includes a counter 50, a selector 52, and a disable signal generating unit 54.

The disable signal generating unit 54 receives a select signal SEL, and generates a disable signal S2 having a level that corresponds to the select signal SEL thus received. The disable signal generating unit 54 includes a transistor 56 and resistors R1 and R2 connected in series between the power supply terminal and the ground terminal. A standby signal STB is input to the gate of the transistor 56. In the standby period, the transistor 56 is switched off, thereby reducing power consumption due to the resistors R1 and R2.

The connection node that connects the resistors R1 and R2 is connected to a select terminal. The resistance values are designed to satisfy the relation R1>>R2. When the select terminal SEL is set to the high-impedance state, or when a high-level signal is applied to the select terminal SEL, the connection node that connects the resistors R1 and R2 is set to the high-level state, and accordingly, the disable signal S2 is set to the low-level state, thereby enabling the start assist function. Conversely, when a low-level signal is input to the select terminal, the disable signal S2 is set to the high-level state, thereby disabling the start assist function. It should be noted that the assignment of the logical level of each signal is a matter of design choice, and is not restricted in particular.

Upon detecting any one of the following events, i.e., returning from the standby state, turning on the power supply, and returning from the lock protection state, the counter 50 counts clocks CLK, thereby providing a predetermined start period Ts. A control signal S1 output from the counter 50 is asserted in the start period Ts, following which the control signal S1 is negated.

The selector 52 receives, as input signals, the control signal S1 and the disable signal S2. When the disable signal S2 is negated (e.g., the low-level state), the selector 52 selects the start pulse signal SP1 in a period in which the control signal S1 is asserted, and selects the control pulse signal CNT1 in a period in which the control signal S1 is negated.

Conversely, when the disable signal S2 is asserted (e.g., high-level state), the selector 52 continuously selects the control pulse signal CNT1. In a case in which the power supply PWM method is used, the control pulse signal CNT1 is set to a constant value. Accordingly, the control pulse signal CNT1 is set to a level which is sufficient for switching on the first operational amplifier OA1 and the second operational amplifier OA2.

As described above, by providing a function of disabling the start assist function, the motor driving circuit 100 can be employed in a platform which employs the power supply PWM method.

The motor driving circuit 100 has a lock protection function of preventing large current from flowing through the fan motor 4 when the rotation of the fan motor 4 stops due to a foreign object being caught in the fan motor 4.

In addition to the lock protection function, the motor driving circuit 100 has a function (quick start function) in which, when the fan motor 4 has been instructed to stop according to the control pulse signal CNT1 for a predetermined time or more, the lock protection function is canceled (deactivated).

1. Lock Protection Function

In a case in which the rotation of the fan motor 4 has stopped although the driving pulse signal DRV1 continues to be switched between the high-level state and the low level state, i.e., in a case in which the fan motor 4 is locked due to uncontrollable circumstances such as the case of a foreign object being caught in the fan or the like, the protection circuit 30 instructs the driving unit 10 to stop to apply current to the fan motor 4. Thus, such an arrangement protects the motor coil against overcurrent.

2. Quick Start Function

In a case in which the control pulse signal CNT1 is maintained at the low level for a predetermined time or more, i.e., in a case in which the fan motor 4 has stopped according to an instruction, the protection circuit 30 permits the driving unit 10 to apply current to the fan motor 4, unlike the case described above. Such an arrangement enables the fan motor 4 to smoothly restart the driving operation after the fan motor 4 has been intentionally stopped.

The protection circuit 30 includes a hysteresis comparator 31, a lock protection circuit 32, and a lock control unit (which will be also referred to as "quick start circuit") 34. Also, the protection circuit 30 may further include a TSD (Thermal Shut Down) circuit and so forth.

The hysteresis comparator 31 makes a comparison between the first Hall signal VH1 and the second Hall signal VH2. When VH1 is greater than VH2, the hysteresis comparator 31 outputs a rectangular signal (FG signal) at the high level, and when VH1 is smaller than VH2, the hysteresis comparator 31 outputs the FG signal at the low level. When the fan motor 4 is rotating, the FG signal has a frequency that corresponds to the rotational speed of the fan motor 4. When the fan motor 4 has stopped, the FG signal is set to a constant level.

When an enable signal EN described later is asserted (switched to the high-level state), the lock protection circuit 32 is set to the active state. When the enable signal EN is negated (switched to the low-level state), the lock protection circuit 32 is set to the inactive state.

When the lock protection circuit 32 is in the active state, the lock protection circuit 32 detects whether or not the fan motor 4 is rotating, by monitoring the FG signal or the like. In a case in which the lock protection circuit 32 has detected that the rotation of the fan motor 4 has stopped (locked), the lock protection circuit 32 asserts a STOP signal (switches the STOP signal to the high-level state) for the control unit 14. When the STOP signal is asserted, the control unit 14 sets the output of the first amplifier AMP1 and the output of the second amplifier AMP2 to the high-impedance state in a predetermined period τ2, which forcibly stops the application of current to the fan motor 4.

The period τ2 in which the current application is stopped is preferably set to several hundreds of milliseconds to several seconds. When the STOP signal is asserted, the application of current to the fan motor 4 is stopped regardless of the duty ratio of the control pulse signal CNT1 or the duty ratio of the start pulse signal SP1. Thus, such an arrangement protects the fan motor 4 against overcurrent due to a case in which the fan motor 4 is locked. It should be noted that a verification period is set, which is a period used for the lock protection circuit 32 to verify that the fan motor 4 is stopped after the fan motor 4 has stopped. The verification period is set to on the order of 0.5 s, and is determined as appropriate, depending on the internal configuration of the lock protection circuit 32.

On the other hand, in the inactive state, the lock protection circuit 32 negates the STOP signal regardless of the state of the FG signal.

In a case in which the control pulse signal CNT1 exhibits the low-level state for a predetermined time or more, the lock control unit 34 negates the enable signal EN (switches the state of the enable signal EN to the low-level state), thereby switching the lock protection circuit 32 to the inactive state. The predetermined time may be set to a period which is sufficiently longer than the cycle of the control pulse signal CNT1, and which is shorter than the verification period used for the lock protection circuit 32 to verify whether or not the fan motor 4 is locked. In the embodiment, the predetermined time is set to 60 ms, for example. This predetermined time, i.e., 60 ms, is determined based upon the off-duty period (low period) of the minimum possible frequency of the control pulse signal CNT1. Also, in a case in which a fan motor with a large amount of static friction is to be driven, the predetermined time should be set to on the order of 250 msec.

The lock control unit 34 includes a counter 36 and a clock generator 38.

The clock generator 38 is an oscillator which generates a clock signal having a predetermined frequency. The predetermined frequency is determined as appropriate according to the aforementioned predetermined time set beforehand. The counter 36 counts the number of clocks generated by the clock generator 38 in a period in which the control pulse signal CNT1 exhibits the low-level state. That is to say, upon detecting a falling edge of the control pulse signal CNT1, the counter 36 resets the count value, and starts to count. The counter 36 counts clocks until the counter is reset when the counter 36 again detects a falling edge of the control pulse signal CNT1. In a case in which, based upon the count result, the counter 36 detects that the control pulse signal CNT1 has exhibited the low-level state for the predetermined time or more, the counter 36 negates the enable signal EN.

When the enable signal EN is negated, the lock protection circuit 32 is switched to the inactive state, and the STOP signal to be output to the control unit 14 is negated. In this stage, the control pulse signal CNT1 continues to exhibit the low-level state. Accordingly, although the STOP signal is negated, no current is applied to the fan motor 4.

Subsequently, the lock protection circuit 32 in the inactive state, which was switched according to the negated enable signal EN, is switched to the active state again when the control pulse signal CNT1 is switched to the high-level state.

The standby control unit 40 receives the enable signal EN. When the enable signal EN is negated, the standby control unit 40 starts to count time. Here, the enable signal EN being negated means that the control pulse signal CNT1 instructs the fan motor 4 to stop its rotational driving operation for a first time period τ1 or more.

Subsequently, when a predetermined second time period τ2 elapses after the time counting is started in the state in which the control pulse signal CNT1 is continuously set to the low-level state, the motor driving circuit 100 is set to the standby mode. In this standby mode, at least a portion of the operations of the motor driving circuit 100 are stopped, thereby reducing power consumption.

In a case in which the control pulse signal CNT1 exhibits the low-level state for the time period (τ1+τ2), the standby control unit 40 asserts the standby signal STB, which switches the motor driving circuit 100 to the standby mode. The standby signal STB is supplied to each circuit block that executes processing which is changed according to the normal mode or the standby mode, and each circuit block which is to be shut down in the standby mode.

Description will be made regarding the standby processing.

The startup circuit 44 is a voltage source which generates a reference voltage for the motor driving circuit 100. In the standby mode, the standby control unit 40 stops the startup circuit 44. In this case, the reference voltage is shut down, and accordingly, a reference current generated using the reference voltage is turned off. This stops the supply of the reference current to each block included in the motor driving circuit 100, thereby reducing power consumption.

Furthermore, the motor driving circuit 100 includes the bias voltage source 42 which generates a Hall bias voltage HB to be supplied to the Hall element 8. In a case in which the standby signal STB has been switched to the high-level state, the bias voltage source 42 is shut down, thereby stopping the supply of the Hall bias voltage to the Hall element 8. This reduces power consumption due to the Hall element 8 and the resistors R11 and R12.

Also, other unnecessary circuits such as the driving unit 10 and so forth may be shut down in the standby mode.

The standby control unit 40 receives the control pulse signal CNT1. When the control pulse signal CNT1 is an instruction to drive the fan motor 4 in the standby mode, the standby control unit 40 negates the standby signal STB (switches the standby signal STB to the low-level state), which returns the motor driving circuit 100 from the standby mode to the normal mode. For example, the standby control unit 40 may judge whether or not the motor driving circuit 100 should be returned to the normal mode, by monitoring edges of the control pulse signal CNT1.

After the mode is returned to the normal mode, the startup circuit 44 is started up, thereby generating the reference voltage. This supplies current to each block of the motor driving circuit 100, thereby resuming its operation.

The above is the configuration of the motor driving circuit 100. Next, description will be made regarding the operation thereof.

Figure 3:
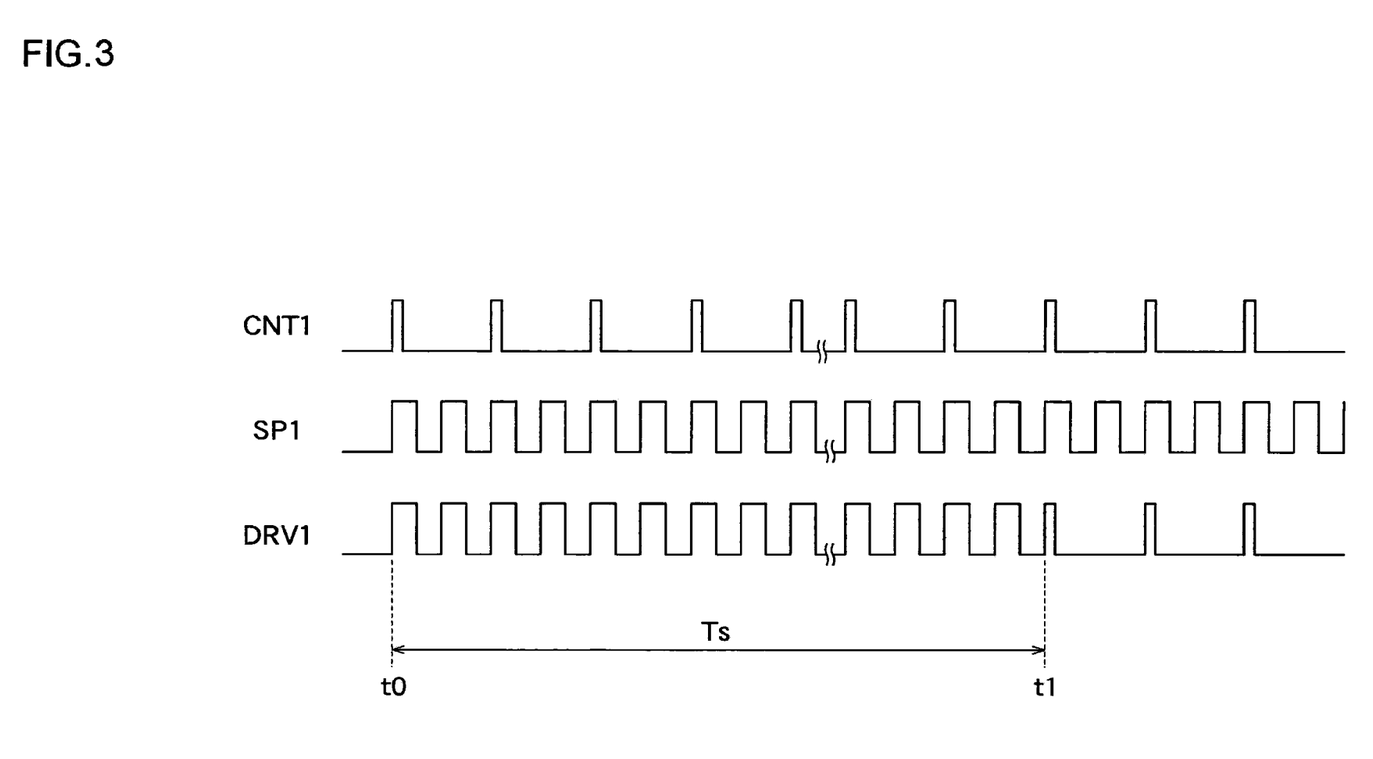
FIG. 3 is a time chart which shows the operation of the motor driving circuit shown in FIG. 2.

FIG. 3 is a time chart which shows the operation of the motor driving circuit 100 shown in FIG. 2. Before the time point t0, the fan motor 4 has stopped, and the motor driving circuit 100 is in the standby mode.

After the time point t0, the external controller 6 outputs a control pulse signal CNT1 having a nonzero duty ratio. Upon receiving this control pulse signal CNT, the motor driving circuit 100 is returned from the standby mode to the normal mode, thereby starting the driving operation for the fan motor 4. After the motor driving circuit 100 is started up, the start pulse signal generating unit 16 starts to generate the start pulse signal SP1.

In the start period Ts, from the beginning of the startup operation, the control unit 14 selects the start pulse signal SP1, and supplies the start pulse signal SP1 thus selected to the driving unit 10. The duty ratio of the start pulse signal SP1 is set to a value which is sufficient for the fan motor 4 to be rotated from the stopped state. Accordingly, the fan motor 4 starts to rotate quickly, and its rotational speed increases toward the rotational speed that corresponds to the duty ratio of the start pulse signal SP1.

Subsequently, at the time point t1 after the start period Ts elapses, the control unit 14 switches the driving pulse signal DRV1 from the start pulse signal SP1 to the control pulse signal CNT1. As a result, the rotational speed control operation by the external controller 6 for the fan motor 4 is enabled, thereby rotating the fan motor 4 at a rotational speed set by the external controller 6.

The above is the operation of the motor driving circuit 100. With the motor driving circuit 100 shown in FIG. 2, the fan motor 4 can be reliably rotated in a sure manner even in a case in which the duty ratio DREXT of the control pulse signal CNT1 output from the external controller is very small. After the rotation of the fan motor 4 is started, such an arrangement is capable of setting the rotational speed to a value that corresponds to the duty ratio DREXT of the control pulse signal CNT1.

That is to say, the designer of the cooling system 2 can design the duty ratio DREXT of the control pulse signal CNT1 giving consideration to only the target rotational speed of the fan motor 4 without being concerned about the minimum duty ratio whereby it is possible to rotate the fan motor 4 when it has stopped, thereby reducing the burdens on the design as compared with conventional arrangements.

Figure 4:
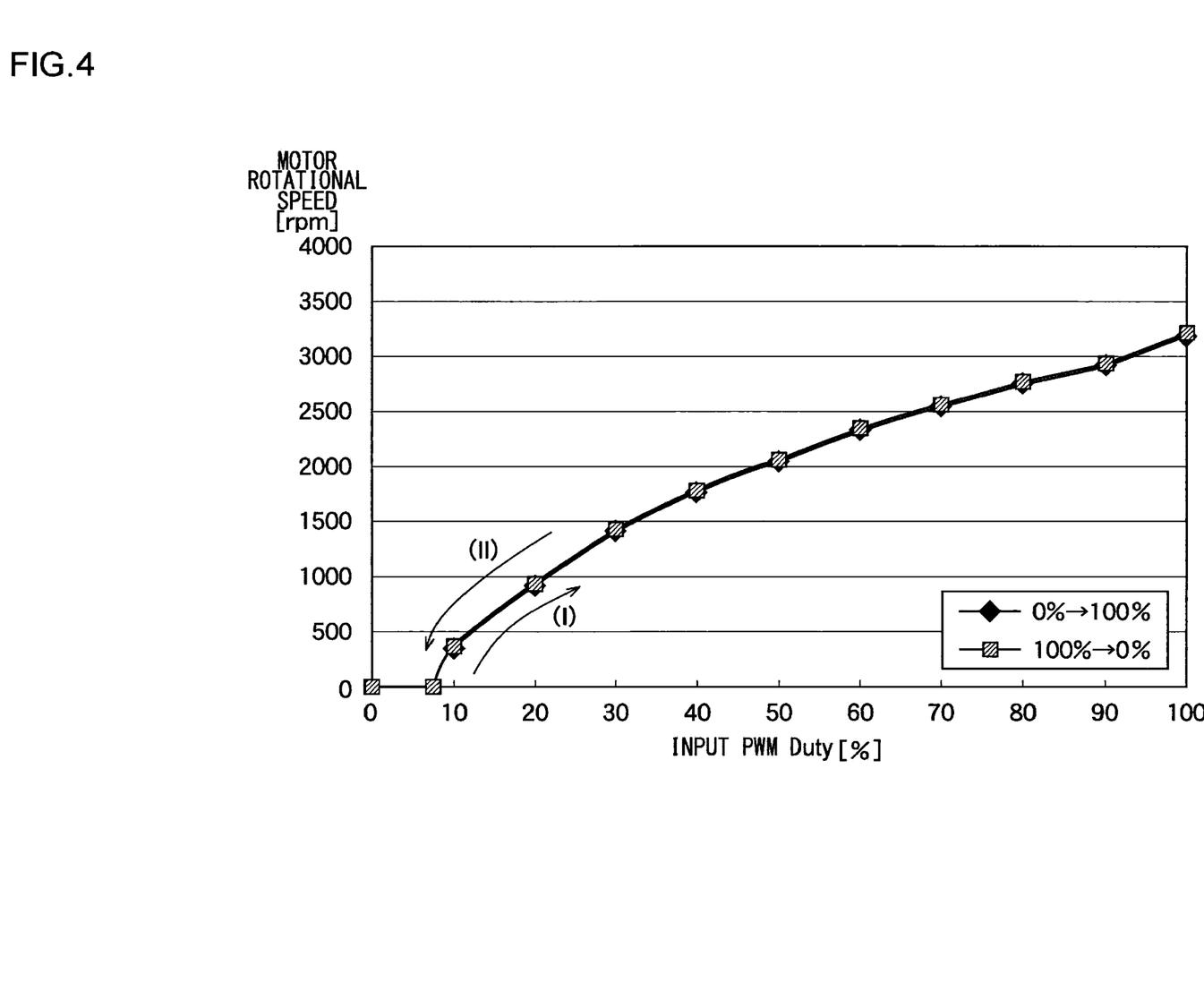
FIG. 4 is a graph which shows the relation between the rotational speed of the fan motor and the duty ratio of a control pulse signal.

FIG. 4 is a graph which shows the relation between the rotational speed of the fan motor 4 included in the cooling system 2 shown in FIG. 2 and the duty ratio DREXT of the control pulse signal CNT1. With the motor driving circuit 100 shown in FIG. 2, in the start period Ts, the driving duty ratio to be applied to the fan motor 4 is set to a predetermined duty ratio, i.e., 50%, regardless of the external duty ratio DREXT. With such an arrangement, when the duty ratio DREXT of the control pulse signal CNT1 is a small value, the driving operation according to the control pulse CNT1 is equivalent to a braking operation performed by reducing the duty ratio, thereby providing the braking properties (II) shown in FIG. 1.

For example, with conventional techniques, when the duty ratio DREXT of the control pulse signal CNT1 is set to 12% in order to rotate the fan motor 4 at 500 rpm, the fan motor 4 in the stopped state cannot be rotated (see FIG. 1). On the other hand, with the motor driving circuit 100 shown in FIG. 2, when the duty ratio DREXT of the control pulse signal CNT1 is set to 12%, the fan motor 4 can be rotated at 500 rpm (FIG. 4).

Furthermore, with the motor driving circuit 100 according to the embodiment, in a case in which the control pulse signal CNT1 exhibits the low-level state for a predetermined time period or more, the lock control unit 34 sets the lock protection circuit 32 to the inactive state. Thus, such an arrangement is capable of distinguishing between when the motor stops according to the control pulse signal CNT1 and an accidental motor lock. Thus, the motor driving circuit 100 is capable of quickly restarting the rotation of the fan motor 4 after the fan motor 4 stops to rotate according to the control pulse signal CNT1. Thus, the cooling operation can be performed quickly in a case in which there is a need to rapidly cool a device when the fan motor 4 has stopped. This function, in combination with the aforementioned function of driving the fan motor 4 with the internal duty ratio DRINT in the aforementioned start period Ts, allows the target 9 to be rapidly cooled.

Next, description will be made regarding other advantages of the embodiment. When the enable signal EN is switched to the low-level state, the standby control unit 40 measures the low level period of the control pulse signal CNT1. In a case in which the low level period time thus measured reaches the second time period τ2, the standby control unit 40 switches the standby signal STB to the high-level state, which stops the operation of each block included in the motor driving circuit 100. As a result, the circuit current of the motor driving circuit 100 is reduced to approximately 0 mA, thereby providing reduced power consumption.

Subsequently, when the control pulse signal CNT1 is switched to the high-level state, the standby control unit 40 switches the standby signal STB to the low-level state, which returns each block of the motor driving circuit 100 to the operation state. In a case in which the driving pulse signal DRV1 has been switched to the high-level state before the second time period τ2 elapses, the mode is not switched to the standby mode, and the rotation of the fan motor 4 is started again. It should be noted that the second time period τ2 may be set to a value equal to or greater than 0, depending on the setting of the counter 36.

As described above, with the motor driving circuit 100 according to the present embodiment, in a case in which the state where there is no instruction to rotate the fan motor 4 is maintained for a predetermined time period (τ1+τ2), the mode is switched to the standby mode, thereby reducing the circuit power consumption as compared with conventional arrangements. Furthermore, the mode is switched to the standby mode according to the enable signal EN. This ensures that the function of the lock protection circuit 32 is disabled when the mode is switched to the standby mode. Thus, such an arrangement is capable of returning the mode from the standby mode to the normal mode so as to rotate the fan motor 4 immediately after an instruction is received to restart the rotation of the fan motor 4.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Figure 5:
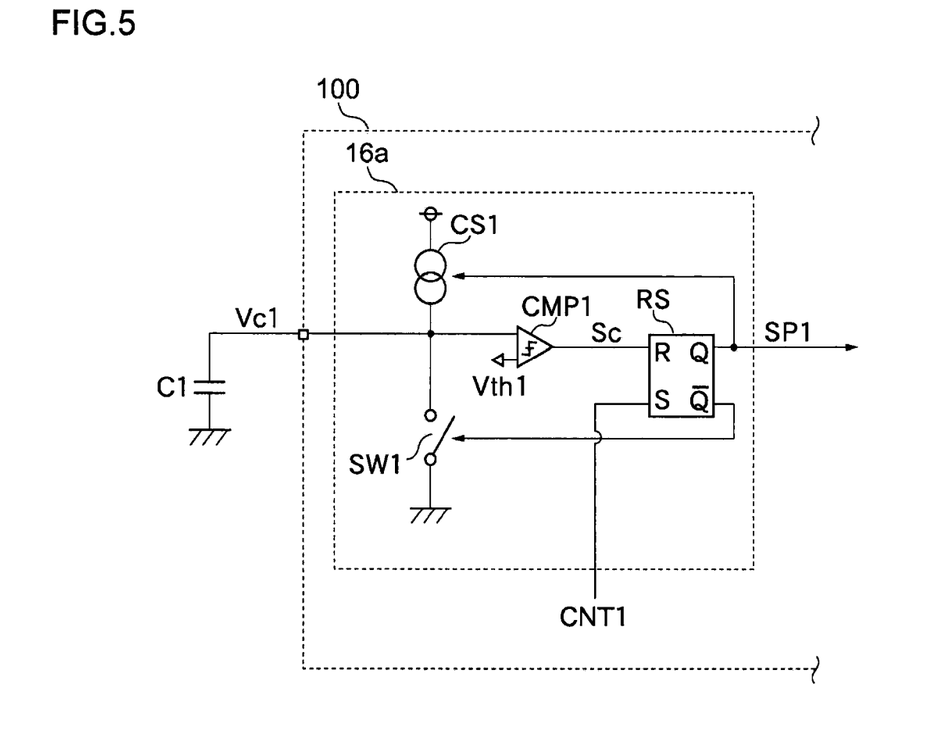
FIG. 5 is a circuit diagram which shows a configuration of a start pulse signal generating unit according to a first modification.

[First modification] In a first modification, the start pulse signal generating unit 16 is not configured as an oscillator, and has a different configuration. FIG. 5 is a circuit diagram which shows the configuration of a start pulse signal generating unit 16a according to the first modification. The start pulse signal generating unit 16a includes a current source CS1, a comparator CMP1, an RS latch, a switch SW1, and a capacitor C1. The capacitor C1 is provided as a component external of the motor driving circuit 100, and one terminal thereof is grounded.

In the active state, the current source CS1 charges the capacitor C1 with a constant current Ic. When the inverted output #Q ("#" represents logical inversion) of the RS latch is set to the high-level state, the switch SW1 is switched on, thereby discharging the charge stored in the capacitor C1. The comparator CMP1 compares the electric potential Vc1 at the capacitor C1 with a predetermined threshold value Vth1. The comparator CMP1 outputs a comparison signal Sc which is switched to the high-level state when Vc1 is greater than Vth1. The RS latch is reset upon detection of a positive edge of the comparison signal Sc, and is set upon detection of a negative edge of the control pulse signal CNT1. When the output Q of the RS latch is set to the high-level state, the current source CS1 is set to the active state.

The start pulse signal generating unit 16a generates a start pulse signal Sp1 which is set to a first level state (high-level state) in a predetermined ON time Ton after detection of a positive edge (or negative edge) of the control pulse signal CNT1, and which is set to a second level state (low-level state), which is complementary to the first level state, in a period until the next positive edge is detected after the first level state.

Figure 6:
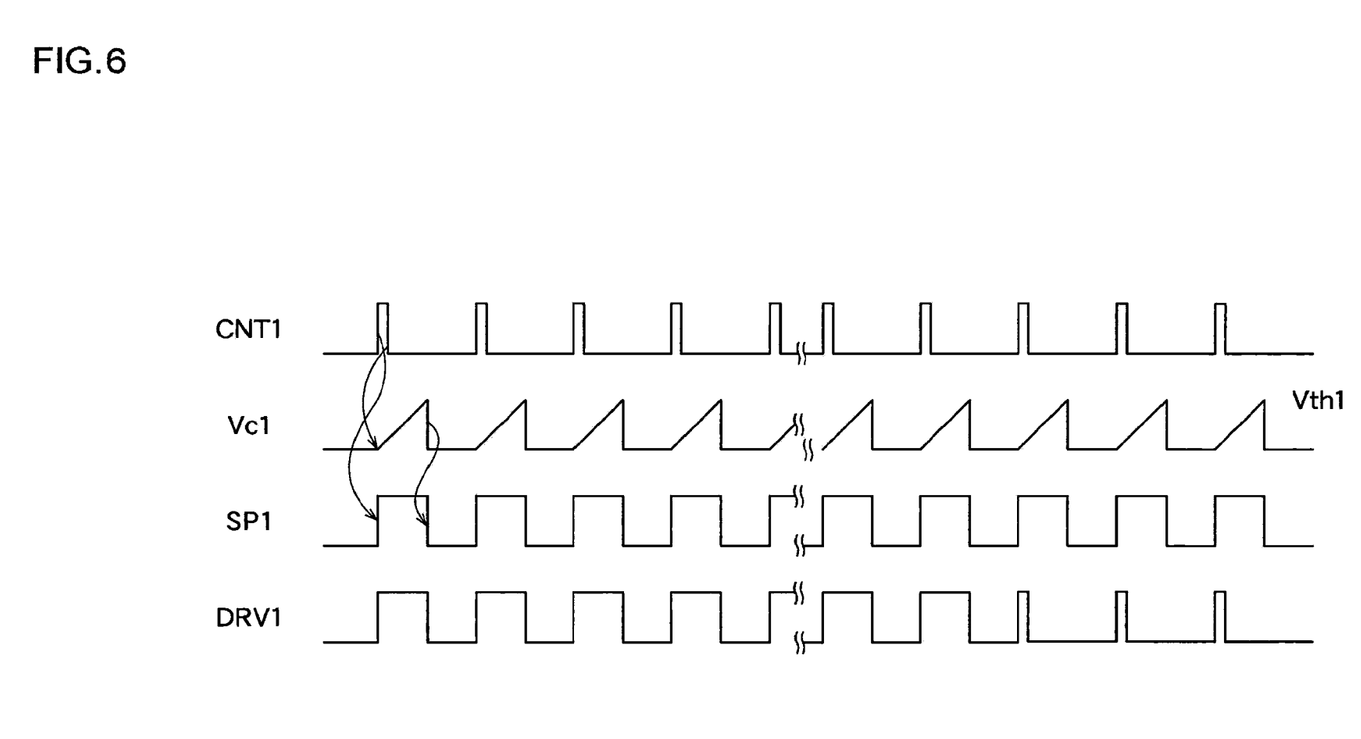
FIG. 6 is a time chart which shows the operation of the motor driving circuit according to a first modification.

FIG. 6 is a time chart which shows the operation of the motor driving circuit according to the first modification. With the start pulse signal generating unit 16a according to the first modification, the start pulse signal SP1 can be generated synchronously with the control pulse signal CNT1. Furthermore, by adjusting the threshold voltage Vth1, such an arrangement is capable of adjusting the duty ratio DRINT of the start pulse signal SP1 as desired.

Also, with the first modification, the control unit 14 may output the logical OR of the start pulse signal SP1 and the control pulse signal CNT1 as the driving pulse signal DRV1 in the start period Ts. That is to say, the first modification provides the signal processing for generating the driving pulse signal DRINT in a simple manner. Furthermore, by adjusting the capacitance of the capacitor C1, such a modification is capable of adjusting the frequency and the duty ratio of the driving pulse signal DRINT, thereby supporting various types of motors.

[Second modification] In second modification, in the start period Ts from the commencement of the driving operation for the fan motor 4, the control unit 14 outputs the start pulse signal SP1 as the driving pulse signal DRV1 only when the duty ratio DREXT of the control pulse signal CNT1 is smaller than a predetermined threshold DRTH. When the duty ratio DREXT of the control pulse signal CNT1 is greater than the threshold value DRTH, the control unit 14 outputs the control pulse signal CNT1 as the driving pulse signal DRV1.

Such a second modification operates effectively in a case in which there is a need to rapidly cool a target 9 the temperature of which has drastically risen when the fan motor 4 has stopped.

With the motor driving circuit 100 shown in FIG. 2, the driving duty ratio applied to the fan motor 4 is forcibly set to DRINT in the start period Ts even if the duty ratio DREXT of the control pulse signal CNT1 is set to 100%. Accordingly, with such an arrangement, the fan motor 4 starts to rotate slowly. On the other hand, with the second modification, when the control pulse signal CNT1 is generated with a duty ratio DREXT which is greater than the threshold value DRTH, the fan motor 4 is driven according to the control pulse signal CNT1 even in the start period Ts. Thus, such a modification allows the rotational speed of the fan motor to be rapidly raised.

[Other modifications] Description has been made regarding an arrangement in which the driving unit 10 applies a driving voltage having a sine-wave-shaped envelope to both terminals of the fan motor 4. However, the present invention is not restricted to such an arrangement. Also, as described in Patent Document 3, for example, the current application time may be PWM controlled by applying a switching signal having a rectangular (pulse-shaped) envelope to the fan motor 4 using an H-bridge circuit.

Description has been made in the embodiment regarding an arrangement in which a single-phase motor is employed as the fan motor 4. However, the present invention is not restricted to such an arrangement. The fan motor 4 may be a multi-phase motor.

Description has been made in the embodiment regarding an arrangement in which the rotation of the fan motor 4 is detected by means of the Hall element 8. However, the present invention is not restricted to such an arrangement. Also, the rotation of the fan motor 4 may be detected by monitoring the inductive voltage that occurs at the coil of the fan motor 4.

Description has been made in the embodiment regarding an arrangement in which the lock control unit 34 monitors the time for which the control pulse signal CNT1 exhibits the low-level state, by instructing the counter 36 to count clocks generated by the clock generator 38. However, the present invention is not restricted to such an arrangement. The time for which the control pulse signal CNT1 exhibits the low-level state may be measured by means of a time constant circuit employing a capacitor and a resistor.

Description has been made in the embodiment regarding an arrangement in which the lock protection circuit 32 monitors the FG signal. However, the present invention is not restricted to such an arrangement. Also, the lock protection circuit 32 may monitor the first Hall signal VH1 and the second Hall signal VH2. Also, the lock protection circuit 32 may monitor the inductive voltage that occurs at the coil of the fan motor 4.

While the preferred embodiments of the present invention have been described using specific terms, such description is for illustrative purposes only, and it is to be understood that changes and variations may be made without departing from the spirit or scope of the appended claims.

What is claimed is:

1. A driving circuit configured to receive a control pulse signal pulse-width modulated according to a target rotational speed, and to drive a motor according to the control pulse signal, the driving circuit comprising:
    a start pulse signal generating unit configured to generate a start pulse signal having a predetermined duty ratio;
    a control unit configured to output, as a driving pulse signal, one signal selected from among the start pulse signal and the control pulse signal; and
    a driving unit configured to drive the motor by pulse width modulation according to the driving pulse signal,
    wherein, in the state in which the motor has stopped, the control unit starts to drive the motor when the duty ratio of the control pulse signal is switched from zero to a nonzero value,
    and wherein, in a start period from the commencement of the driving operation for the motor, the control unit outputs the start pulse signal as the driving pulse signal,
    and wherein, after the start period elapses, the control unit outputs the control pulse signal as the driving pulse signal, and
    wherein the start pulse signal generating unit generates a start pulse signal which is set to a first level for a predetermined ON time after one edge selected from among a positive edge and a negative edge of the control pulse signal is detected, and which is set to a second level which is complementary to the first level until the next selected edge is detected after the first level state.

2. A driving circuit according to claim 1, wherein, in the start period, when the duty ratio of the control pulse signal is smaller than a predetermined threshold value, the control unit outputs the start pulse signal as the driving pulse signal, and when the duty ratio of the control pulse signal is greater than the threshold value, the control unit outputs the control pulse signal as the driving pulse signal.

3. A driving circuit according to claim 1, wherein the start pulse signal generating unit includes an oscillator which oscillates with a predetermined frequency.

4. A driving circuit according to claim 1, wherein the start period is a time period from the commencement of the driving operation for the motor until a predetermined time elapses.

5. A driving circuit according to claim 1, wherein the start period is a period of time from the commencement of the driving operation of the motor until the rotational speed of the motor reaches a predetermined value.

6. A driving circuit according to claim 1, further comprising:
    a lock protection circuit configured to stop the application of current to the motor in a case in which the motor is stopped; and
    a lock control unit configured to set the lock protection circuit to the inactive state in a case in which the control pulse signal instructs the motor to stop its operation for a first time period or more.

7. A cooling apparatus comprising:
    a fan motor; and
    a driving circuit according to claim 1, configured to drive the fan motor.

8. A driving circuit according to claim 1, further comprising a select terminal configured to receive a select signal which is an instruction for enabling and disabling the driving operation performed according to the start pulse signal.

9. A driving circuit according to claim 8, wherein the control unit comprises:
    a counter configured to provide a predetermined start period by counting clocks upon detecting at least one event from among an event in which the mode is returned from a standby mode, an event in which a power supply is turned on, and an event in which the mode is returned from a lock protection mode; and
    a selector configured to select the start pulse signal when the output of the counter indicates the start period, and to select the control pulse signal when the output of the counter indicates a period other than the start period, and wherein, when the select signal is an instruction to disable the driving operation performed according to the start pulse signal, the selector continuously selects the control pulse signal.

10. A driving circuit according to claim 9, wherein the control unit further comprises:
    a P-channel MOSFET (Metal Oxide Semiconductor Field Effect Transistor) and a first resistor arranged in series between a power supply terminal and the select terminal; and
    a second resistor arranged between the select terminal and the ground terminal,
    wherein the selector judges whether the driving operation according to the start pulse signal is to be enabled or disabled, based upon the electric potential that occurs at the select terminal.

11. A driving circuit according to claim 9, wherein the control unit further comprises:
    a P-channel MOSFET (Metal Oxide Semiconductor Field Effect Transistor) and a first resistor arranged in series between a power supply terminal and the select terminal; and
    a second resistor arranged between the select terminal and the ground terminal,
    wherein the selector judges whether the driving operation according to the start pulse signal is to be enabled or disabled, based upon the electric potential that occurs at the select terminal.

12. A driving circuit configured to receive a control pulse signal pulse-width modulated according to a target rotational speed, and to drive a motor according to the control pulse signal, the driving circuit comprising:
    a start pulse signal generating unit configured to generate a start pulse signal having a predetermined duty ratio;
    a control unit configured to output, as a driving pulse signal, one signal selected from among the start pulse signal and the control pulse signal;
    a driving unit configured to drive the motor by pulse width modulation according to the driving pulse signal; and
    a select terminal configured to receive a select signal which is an instruction for enabling and disabling the driving operation performed according to the start pulse signal, wherein, in the state in which the motor has stopped, the control unit starts to drive the motor when the duty ratio of the control pulse signal is switched from zero to a nonzero value, and wherein, in a start period from the commencement of the driving operation for the motor, the control unit outputs the start pulse signal as the driving pulse signal, and wherein, after the start period elapses, the control unit outputs the control pulse signal as the driving pulse signal, and wherein the control unit comprises:
- a counter configured to provide a predetermined start period by counting clocks upon detecting at least one event from among an event in which the mode is returned from a standby mode, an event in which a power supply is turned on, and an event in which the mode is returned from a lock protection mode; and
- a selector configured to select the start pulse signal when the output of the counter indicates the start period, and to select the control pulse signal when the output of the counter indicates a period other than the start period, and wherein, when the select signal is an instruction to disable the driving operation performed according to the start pulse signal, the selector continuously selects the control pulse signal.

13. A driving circuit according to claim 12, wherein, in the start period, when the duty ratio of the control pulse signal is smaller than a predetermined threshold value, the control unit outputs the start pulse signal as the driving pulse signal, and when the duty ratio of the control pulse signal is greater than the threshold value, the control unit outputs the control pulse signal as the driving pulse signal.

14. A driving circuit according to claim 12, wherein the start pulse signal generating unit includes an oscillator which oscillates with a predetermined frequency.

15. A driving circuit according to claim 12, wherein the start pulse signal generating unit generates a start pulse signal which is set to a first level for a predetermined ON time after one edge selected from among a positive edge and a negative edge of the control pulse signal is detected, and which is set to a second level which is complementary to the first level until the next selected edge is detected after the first level state.

16. A driving circuit according to claim 12, wherein the start period is a time period from the commencement of the driving operation for the motor until a predetermined time elapses.

17. A driving circuit according to claim 12, wherein the start period is a period of time from the commencement of the driving operation of the motor until the rotational speed of the motor reaches a predetermined value.

18. A driving circuit according to claim 12, further comprising:
- a lock protection circuit configured to stop the application of current to the motor in a case in which the motor is stopped; and
- a lock control unit configured to set the lock protection circuit to the inactive state in a case in which the control pulse signal instructs the motor to stop its operation for a first time period or more.

19. A cooling apparatus comprising:
a fan motor; and
a driving circuit according to claim 12, configured to drive the fan motor.

* * * * *